United States Patent [19]

Morse, II et al.

[11] 4,185,462

[45] Jan. 29, 1980

[54] FLUID FITTING FOR TURBOFAN ENGINES

[75] Inventors: Robert A. Morse, II, Amesbury, Mass.; Alfred J. Rondina, Jr., Pensacola, Fla.

[73] Assignee: General Electric Company, Lynn, Mass.

[21] Appl. No.: 893,553

[22] Filed: Apr. 5, 1978

[51] Int. Cl.² .................... F02K 3/10; F16L 55/00
[52] U.S. Cl. .................................. 60/261; 60/262; 60/39.09 F; 60/39.31; 285/13
[58] Field of Search ................... 285/13, 14, 321; 60/262, 261, 39.08, 39.31, 39.32, 39.74 R, 39.09 F

[56] References Cited

U.S. PATENT DOCUMENTS

| | | |
|---|---|---|
| 2,949,736 | 8/1960 | Rubbra .................... 60/39.09 F |
| 3,489,435 | 1/1970 | Weber ........................ 285/13 |
| 3,556,444 | 1/1971 | Kopp ..................... 60/39.09 F |
| 3,612,577 | 10/1971 | Pope ......................... 285/14 |
| 3,800,530 | 4/1974 | Nash ......................... 60/262 |
| 3,910,038 | 10/1975 | Bourdereau ............. 60/39.74 R |
| 4,050,722 | 9/1977 | Berger ...................... 285/321 |

*Primary Examiner*—Douglas Hart
*Attorney, Agent, or Firm*—Henry J. Policinski; Derek P. Lawrence

[57] ABSTRACT

A connecting device for use in a gas turbine engine is provided wherein first and second fluid carrying members disposed in a plenum are maintained engaged in a substantially fluid-tight joint. Means are provided for establishing a leakage path from the joint to a location exterior to the plenum with the pressure at the exterior location being lower than the pressure of air in the plenum.

6 Claims, 2 Drawing Figures

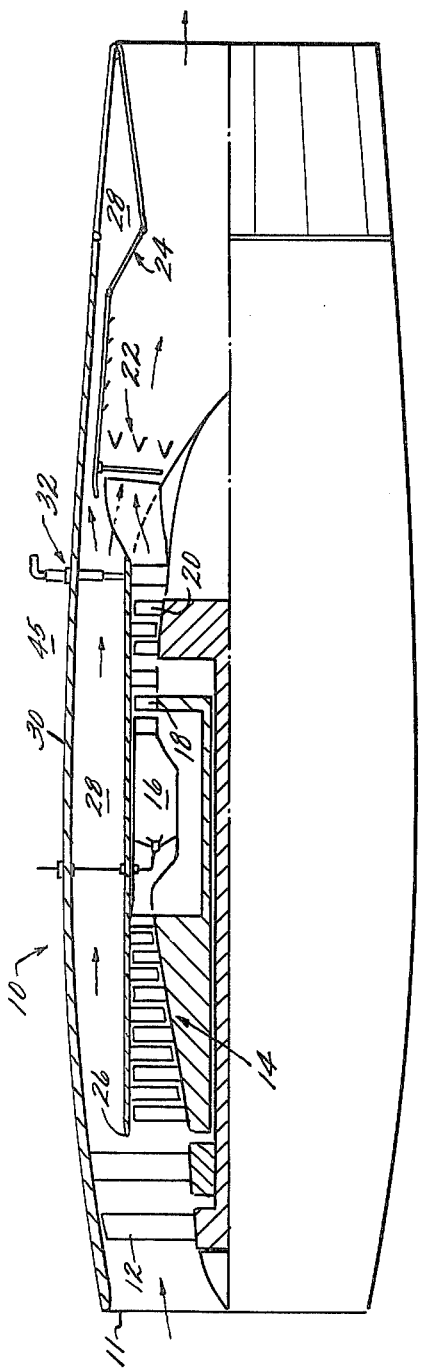
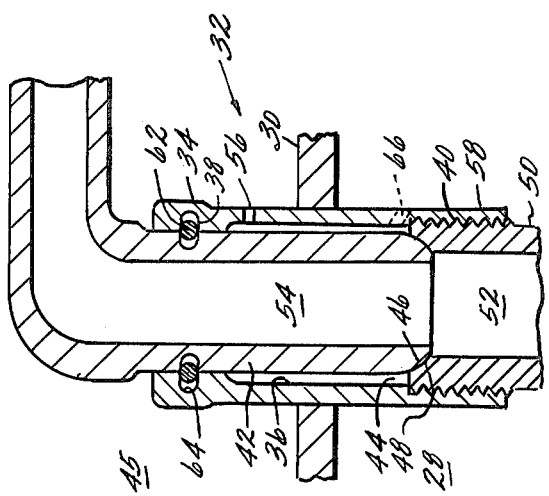

FLUID FITTING FOR TURBOFAN ENGINES

The Government has rights in this invention pursuant to Contract No. N00019-76-C-0261 awarded by the Department of Navy.

BACKGROUND OF THE INVENTION

This invention relates to a gas turbine engine and more particularly to apparatus for connecting two fluid carrying members together within a gas turbine engine.

Modern gas turbine engines, particularly those engines used to power aircraft, include in a serial flow relationship an inlet, a front fan, a compressor, a combustor, a high temperature turbine to power the compressor and a low temperature turbine to power the front fan. In many of these engines, not all of the air passing through the inlet flows through the remaining engine components. Typically in these engines, a splitter downstream of the fan divides the inlet in stream into two streams: a core air stream, which passes through the compressor, combustor and turbines; and a bypass air stream which flows around these engine components. The bypass stream flows aftward in an annular plenum in an axially extending circumferential duct disposed radially outwardly of the other engine components and may be recombined with the core stream at various axial locations downstream of the engine turbine section. Additionally or alternatively, the bypass stream may be used to cool other components of the engine.

Since the annular plenum carrying the bypass stream surrounds the other components of the engine it is necessary that fluid supply lines associated with the internal engine components must pass through the bypass plenum. Im many instances to facilitate assembly of the engine, it is necessary to provide fluid fittings or connectors associated with these supply lines and to dispose such connectors in the bypass plenum. Occasionally, the connectors may leak and hence some of the fluid carried by the supply lines becomes entrained in the bypass air stream. As the contaminated bypass stream flows aftward, the entrained fluid may become deposited on other engine components or accumulate in cavities or recesses of the engine. In the instance the supply lines carry engine fuel or oil, the accumulated or deposited fluid may create conditions conducive to undesirable combustion. The present invention is directed at preventing this condition.

Therefore, it is an object of the present invention to provide means for preventing fluid leaking from fittings or connectors disposed within a gas turbine engine from accumulating therewithin or from contaminating the internal components of the engine. It is another object of the present invention to provide means whereby a leaking fitting or connector may be readily detected without disassembly of the gas turbine engine.

SUMMARY OF THE INVENTION

Briefly stated, this and other objects which will become apparent from the following specification and appended drawings are accomplished by the present invention wherein a connector is disposed in a bypass plenum and connects first and second fluid carrying members to each other at a substantially fluid-tight joint. Means are disposed between the plenum and the joint for establishing a fluid leakage path extending from the joint to a location exterior of the plenum. The exterior location is disposed at a lower pressure than the pressurized fluid flowing in the plenum. Means may be provided for admitting pressurized fluid from the plenum to the leakage path for establishing a flow of pressurized plenum fluid in the path away from the joint and toward the exterior location.

BRIEF DESCRIPTION OF THE DRAWINGS

While the specification concludes with claims distinctly claiming and particularly pointing out the invention described herein, it is believed the invention will be more readily understood by reference to the discussion below and the accompanying drawings in which:

FIG. 1 depicts a schematic representation of a gas turbine engine embodying the present invention.

FIG. 2 depicts a cross-sectional enlarged view of the present invention.

DESCRIPTION OF THE PREFERRED EMBODIMENT

Referring now to FIG. 1, a schematic view of a typical gas turbine engine in which the present invention may be utilized is shown generally at 10. Gas turbine engine 10 is comprised generally of inlet portion 11, fan or booster portion 12, compressor portion 14, combustor portion 16, high pressure turbine portion 18, low pressure turbine portion 20, after burner portion 22 and exhaust duct portion 24 all disposed in a serial flow relationship. A first fluid in the form of air entering inlet portion 11 is compressed by booster portion 12 and then is divided by splitter 26 into two flow streams of air; a core stream flowing through the core compressor 12 and the remaining components of the engine in serial flow relationship; and a bypass stream flowing in an annular axially extending plenum 28 defined at its radially inward boundary by the core engine and at its radially outward boundary by the engine casing 30. The method of operation of the gas turbine engine 10 is generally wellknown in the art and hence a detailed description thereof is not necessary for an understanding of the present invention.

Assembly of gas turbine engine 10 is facilitated if oil and other fluid delivery lines are joined by connectors disposed within the pressurized fluid or air flowing in plenum 28. More specifically, the core engine may be built up with fluid delivery lines protruding therefrom. The engine casing 30 which may be comprised of sections, is then slid over the core engine. Supply lines external to the casing are inserted through appropriate apertures in casing 30 into plenum 28 and then connected to the supply line protruding from the core engine. The connector comprising the present invention is depicted schematically at 32 in FIG. 1.

Referring now to FIG. 2, a cross-sectional view of the connector 32 disposed partially within plenum 28 is depicted mounted on engine casing 30.

More specifically, the connector 32 is comprised of an elongated hollow cylindrical member 34 having an internal cylindrical surface 36 disposed intermediate recess 38 and threaded portion 40 which are themselves located spaced apart at opposite ends of cylindrical member 34. A first fluid carrying member or conduit 42 partially resides within the hollow portion of cylindrical member 34 and is spaced apart from surface 36 to form a leakage path 44. An annular seating surface 46 is disposed at one end of conduit 42 and is adapted to abut in sealing engagement a second annular seating surface 48 disposed on a second fluid carrying member or conduit 50 also received within the hollow portion of cylindrical member 34. With sealing surfaces in sealing engagement, a fluid-tight joint is formed therebetween and fluid may flow through passage 52 in conduit 50 and through passage 54 in conduit 42. Conduits 42 and 50 are adapted to carry a second fluid such as oil or fuel used in the operation of the engine.

It is observed that leakage path 44 formed between surface 36 of member 34 and conduit 42 extends from a location proximate the fluid tight to a location exterior to plenum 28. Cylindrical member 34 is provided with a plurality of overboard vents 56 (only one of which is shown) extending radially therethrough and communicating leakage path 44 with the environment 45 external to member 34. This external environment 45 may be an ambient environment or a pressurized environment so long as the pressure of the environment 45 is less than the pressure existing in plenum 28.

Clamping means are provided for clamping conduits 42 and 50 together whereby annular surfaces 46 and 48 are held in abutting engagement to establish a substantially fluid-tight joint. More specifically, threaded end portion 40 of cylindrical member 34 is adapted to threadably engage with a threaded end portion 58 of conduit 50. Additionally, a retaining wire 62 resides partially in annular recess 38 of cylindrical member 34 and partially within annular recess 64. Cylindrical member 34 may be rotated to advance the threaded portion 40 into threaded portion 58 whereby surfaces 46 and 48 are forced into abutting sealing relationship with each other. Cylindrical member 34 can be further rotated until engagement of wire 62 with the walls of recesses 38 and 64 is effected. Upon this occurrence conduits 42 and 50 are effectively clamped together and the fluid-tight joint established.

The device hereinbefore described is well adapted to accomplish the objects of the present invention. In the event fluid flowing in passages 52 and 54 leaks past the joint between annular surfaces 46 and 48, the fluid will enter leakage path 44. Confined within leakage path 44, the leaked fluid will eventually flow through overboard vent 56 to the external environment 45. In this manner then leaked fluid is prevented from entering plenum 28 and hence a leaking fitting may be readily detected without disassembly of the engine through observation of the presence of leaked fluid in external environment 45.

Another aspect of the present invention will now be discussed. By providing a relatively loose fit between threaded portions 40 and 58, air from plenum 28 can pass at a very low flow rate into the flow path 44. Establishing fluid communication between path 44 and plenum 28 in this manner establishes a flow of pressurized air in flow path 44 away from the joint and toward overboard vent 56. Fluid leaking past annular surfaces 46 and 48 at the joint is entrained in the flowing air stream in flow path 44 and is carried out through vent 56. In this manner, the passage of leaked fluid away from the plenum 28 and toward external environment 45 is further enhanced. Alternatively to loose fitting threads, the same enhanced effect may be accomplished by providing aperture 66 (defined by dotted lines in FIG. 2) in cylindrical member 34. Furthermore, it is an important aspect of the present invention that the pressure in external environment 45 is lower than the pressure in plenum 28 so that any fluid leaking past annular surfaces 46 and 48 migrates toward environment 45 and away from plenum 28.

While the preferred embodiment of my invention has been described fully in order to explain its principles, it is understood that various modifications or alterations may be made therein without departing from the scope of the invention as set forth in the appended claims.

What is claimed is:

1. For use in a gas turbine engine having a plenum of pressurized fluid flowing therein the invention comprising:
   first and second fluid carrying members disposed in said plenum and adapted to carry a second fluid;
   clamping means for maintaining said members engaged at a substantially fluid-tight joint, said joint disposed in said plenum;
   means disposed between said plenum and said joint for establishing a fluid leakage path for said second fluid, said path extending from said joint to a location exterior to said plenum, said exterior location disposed at a pressure lower than the pressure in said plenum.

2. The invention as set forth in claim 1 further comprising:
   means for admitting said pressurized plenum fluid from said plenum to said leakage path for establishing a flow of said pressurized plenum fluid in said path away from said joint and toward said exterior location.

3. The invention set forth in claim 1 wherein said path establishing means comprise an elongated cylindrical hollow member surrounding one of said fluid carrying members and spaced therefrom to define said fluid leakage path.

4. The invention as set forth in claim 2 wherein said admitting means is comprised of an aperture extending through said hollow member to establish fluid communication between said fluid leakage path and said plenum.

5. For use in a gas turbine engine, having a plenum of pressurized air therein, a connecting device comprising:
   first and second fluid conduits having first and second sealing surfaces, respectively in abutting sealing engagement in said plenum to define a substantially fluid-tight joint;
   a hollow member surrounding at least one of said conduits and spaced therefrom to define a fluid leakage path between said hollow member and said one of said conduits said path extending from said joint to a location exterior to said plenum, said location disposed at a lower pressure than the pressure in said plenum; and
   clamping means for maintaining engagement between said surfaces.

6. The invention as set forth in claim 5 further comprising:
   means for admitting pressurized air from said plenum to said leakage path for establishing a flow of pressurized air in said path away from said joint and toward said exterior location.

* * * * *